Aug. 9, 1955    F. K. KNOHL    2,714,754
FASTENING DEVICE
Filed May 24, 1952
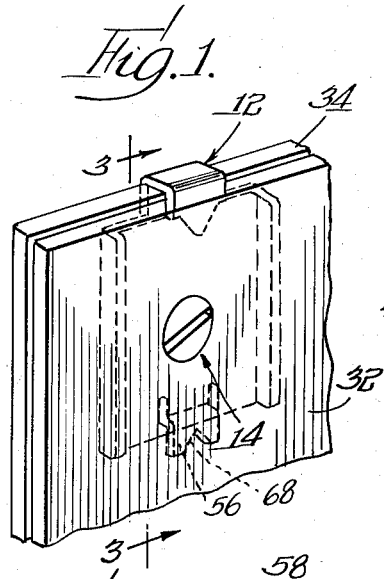
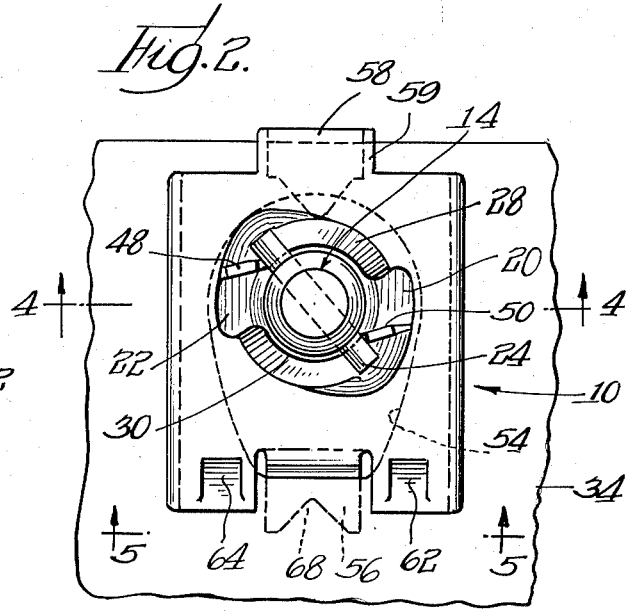
INVENTOR.
Friedrich Karl Knohl
BY
Moore, Olson & Trexler
Attys.

United States Patent Office 2,714,754
Patented Aug. 9, 1955

2,714,754

FASTENING DEVICE

Friedrich Karl Knohl, Roselle, Ill., assignor to Illinois Tool Works, Chicago, Ill., a corporation of Illinois Application May 24, 1952, Serial No. 289,724

3 Claims. (Cl. 24—221)

The present invention relates to fastening devices for detachably securing work pieces together, and more particularly to fastening devices of the type wherein a locking device is carried by one work piece, and a rotatable stud is carried by the other work piece.

Locking devices of the above general type have been extensively used for securing together work pieces, such as cowling parts of airplanes, and in the past, the locking device, which is preferably made of sheet metal, has been secured to its associated part by screws, rivets, or by welding. These methods of securing the locking device are relatively time consuming and expensive. It is, therefore, an object of this invention to provide in a fastening device of the above described type a sheet metal locking device, which may be quickly assembled with its associated work piece without the use of separate or auxiliary securing means.

Another object of this invention is to provide a fastening device of the above type, wherein upon rotation of the stud, stresses are set up in the sheet metal locking device which place the stud under tension to firmly clamp the work pieces between the stud and the locking device and to prevent inadvertent disassembly of the stud from the locking device.

Other objects and advantages of the present invention will be apparent from the following description and the drawings, wherein:

Fig. 1 is a perspective view, showing work pieces assembled with a fastening device embodying the principles of the present invention;

Fig. 2 is a plan view, showing the back of the assembly of Fig. 1;

Fig. 3 is a partial vertical cross section taken along line 3—3 in Fig. 1;

Fig. 4 is a partial vertical cross section taken along line 4—4 in Fig. 2;

Fig. 5 is a partial vertical cross section taken along line 5—5 in Fig. 2; and

Fig. 6 is a plan view, showing a flat blank from which the sheet metal locking device of the present invention is formed.

Referring now more specifically to the drawings, wherein like parts in the several figures are designated by the same numeral, a fastening device embodying the principles of this invention is generally designated by the numeral 10. The fastening device includes a locking device 12, preferably formed from sheet metal and a rotatable stud 14.

The locking device 12 includes a body section 16, having a stud receiving opening 18 therein. The section 16 is cut away, as at 20 and 22, in order to receive the cross pin 24, extending laterally outwardly from the shank 26 of the stud 14. The portions of the section 16 surrounding the opening 18 are embossed upwardly to form the cam surfaces 28 and 30, which are adapted to cooperate with the opposite ends of the cross pin 24 to draw the stud 14 and its associated work piece 32 into assembled relationship with the locking device 12 and its associated work piece 34. As shown best in Figs. 3 and 4, the cam surfaces 28 and 30 are provided with portions 36 and 38, which extend below the plane of the body section 16. The portions 36 and 38 are provided to facilitate the initial assembly of the cross pin 24 over the cam surfaces by making it unnecessary to have the work pieces 32 and 34 in closely assembled relationship before the cross pin 24 can extend beyond the cam surfaces.

The body section 16 terminates along opposed edges in flanges 40 and 42, which extend inwardly substantially normal to the plane of the body section. The flanges 40 and 42 are adapted to engage the surface of the work piece 34 to space the body section therefrom. Thus, when the stud 14 is twisted so that the ends of its cross pin 24 ride up on the cam surfaces 28 and 30, the flexible body section 16 may be flexed or deformed downwardly, thereby setting up stresses in the body section, which place the stud 14 under tension, whereby the stud is prevented from loosening. In order to provide additional assurance against the loosening of the stud, the cam surfaces are provided with depressed portions 44 and 46 into which the ends of the pin ride when the stud has been turned to its fully assembled position. While the surfaces of these depressed portions 44 and 46 are lower than the highest point of the cam surfaces, they are sufficiently high to maintain the tension on the stud to hold the stud into position and firmly clamp the work pieces together. In order to prevent the stud from being turned so that the ends of the pin pass beyond the depressed portions, stops 48 and 50 are provided.

An important feature of this invention resides in the manner in which the locking device 12 is secured to its associated work piece 34. As shown best in Fig. 3, a securing tab 52 extends inwardly from one marginal portion of the body section 16 and through the opening 54 in the work piece 34. The tab 52 terminates in an outwardly extending flange or hook portion 56, which engages the opposite surface of the work piece to hold the locking device 12 against separation from the work piece. A similar locking tab 58 extends from the opposed marginal portion of the section 16 and is provided with a terminal flange or hook portion 60, which overlies the opposite surface of the work piece. As shown in the drawings, the tab 58 is connected with the body section 16 by a connecting portion 59. By varying the length of the connecting portion 59 within the reasonable limits, the locking device 12 can be adapted to be secured to work pieces having the apertures 54 disposed at varying distances from their marginal edge. As shown best in Figs. 2 and 6, the connecting portion 59 preferably has a width slightly greater than the width of the tab 58 to provide the desired rigidity in the structure. The embodiment shown herein is particularly adapted to be assembled with a work piece, wherein the opening 54 is disposed adjacent one marginal edge of the work piece 34. Thus, it is seen that the tab 58 extends about the marginal edge of the work piece, and the flange 60 is turned in the same direction as the flange 56. To assemble the locking device 12, having the preferred structure described herein, with the work piece, it is merely necessary to insert the tab 52 through the opening 54 and then slide the locking device downwardly, as shown in Fig. 3, to bring the hook portions 56 and 60 into engagement with the surface of the work piece. It is seen that the locking tab 58 with its hook portion 60 not only retains the locking device 12 in assembled relationship with the work piece, but it also prevents the locking device from turning or twisting about the tab 52, whereby the stud receiving opening 18 is maintained in alignment with the opening 54 in the work piece. In order to prevent the locking device from sliding laterally of the plate, locking projections 62 and 64 are struck from the body section 16 and bent inwardly, as shown best in Figs. 3 and 5. The locking projections 62 and 64 thus present teeth edges for engagement with the surface of the work piece 34 to prevent the locking device from sliding over the work piece.

As shown in Figs. 2 and 3, the aperture 54 in the plate 34 is long enough to receive both the stud 14 and the locking tab 52. However, it is clear that instead of the single aperture 54, two apertures could be provided, one to receive the stud and the other to receive the locking tab 52. Moreover, it is within the purview of this invention to adapt the device for assembly with a work piece, wherein the aperture 54 is located at a mid portion of the work piece. In such a case, it would be necessary to provide an aperture in the work piece through which the locking tab 58 could extend.

Fig. 6 shows a flat blank from which the above described locking device 12 may be readily manufactured. The flat blank may be easily stamped from a continuous sheet metal strip, and in order to conserve material, it is noted that the flange 60 terminates in a pointed portion 66, which is struck from the flange portion 56 of a preceding blank to form a notch 68 in the flange or hook portion 56. The cam surface 28 may then be formed by suitable stamping operation, and at the same time, the stops 48 and 50 may be formed by folding the blank along the fold lines indicated by dotted lines. The flanges 40 and 42 and the tabs 52 and 58 may then be formed by folding the blank in a well known manner.

From the above description, it is seen that the present invention provides a simple fastening device, wherein the sheet metal locking device may be easily and relatively cheaply manufactured from a flat blank and wherein the locking device may be quickly assembled with a work piece without the aid of separate securing means. Furthermore, it is seen that a locking device made in accordance with the principles of the present invention is simple to operate, while providing a secure assembly. While I have described and shown the preferred embodiment of the present invention herein, it is obvious that numerous changes may be made in the details of the fastening device without departing from the spirit and scope of the appended claims.

I claim:

1. A fastening device for detachably securing together workpieces, and comprising a relatively broad resilient sheet material body section having within its opposed margins an aperture for receiving a stud shank having lugs extending outwardly therefrom, spacing flanges extending from opposed margins of the body section toward a workpiece for engagement therewith to space the body section from the workpiece in position for flexing thereof under stress, cam surfaces around the aperture in said body section for cooperation with the lugs extending from the stud shank to place the body section under stress when the stud is rotated to secure the workpieces, and locking lugs on said body section and housed within the spacing flanges and extending in an inclined direction toward the adjacent workpiece for impinging the same to prevent relative movement between the workpiece and the body section, said spacing flanges preventing complete collapse of said locking lugs when the body section is under stress and said body section under stress serving to effect more aggressive impingement between the locking lugs and the adjacent workpiece.

2. A fastening device as claimed in claim 1, wherein a margin of the body section between said flanges is provided with a hook member adapted to extend beyond the workpiece and engage the opposite surface thereof for locating the fastening device upon installation thereof in one direction, and wherein said locking lugs extend in opposition to said hook member to resist removal of the fastening device in the opposite direction.

3. A fastening device as claimed in claim 1, wherein opposed margins of the body section between said spacing flanges are each provided with a hook member adapted to extend beyond and engage the opposite surface of the workpiece for locating the fastening device upon installation thereof in one direction, and wherein said locking lugs extend in opposition to said hook members to resist removal of the fastening device in the opposite direction, said locking lugs being positioned adjacent one hook member and on opposite sides thereof.

References Cited in the file of this patent

UNITED STATES PATENTS

| | | |
|---|---|---|
| 2,115,312 | Lombard | Apr. 26, 1938 |
| 2,274,014 | Tinnerman | Feb. 24, 1942 |
| 2,382,942 | Murphy | Aug. 14, 1945 |
| 2,504,358 | Swanson | Apr. 18, 1950 |
| 2,552,499 | Tinnerman | May 8, 1951 |
| 2,612,927 | Aylor | Oct. 7, 1952 |